(12) United States Patent
Brochman

(10) Patent No.: US 11,110,646 B2
(45) Date of Patent: Sep. 7, 2021

(54) PEX TUBING EXPANDER HEAD

(71) Applicant: Brochman Innovations, LLC, White Bear Lake, MN (US)

(72) Inventor: Todd Brochman, White Bear Lake, MN (US)

(73) Assignee: Brochman Innovations, LLC, White Bear Lake, MN (US)

( * ) Notice: Subject to any disclaimer, the term of this patent is extended or adjusted under 35 U.S.C. 154(b) by 0 days.

(21) Appl. No.: 16/519,684

(22) Filed: Jul. 23, 2019

(65) Prior Publication Data

US 2021/0023767 A1    Jan. 28, 2021

(51) Int. Cl.
  *B29C 57/04* (2006.01)
  *B29L 23/00* (2006.01)
  *B29K 23/00* (2006.01)

(52) U.S. Cl.
  CPC ...... *B29C 57/04* (2013.01); *B29K 2023/0691* (2013.01); *B29L 2023/22* (2013.01)

(58) Field of Classification Search
  CPC .......... B29C 57/04; B29C 57/045; B29K 2023/0691; B29L 2023/22; B21D 41/02; B21D 41/026; B21D 41/028; B21D 39/20
  See application file for complete search history.

(56) References Cited

U.S. PATENT DOCUMENTS

| | | | |
|---|---|---|---|
| 1,931,352 A | 10/1933 | Kemp | |
| 2,999,529 A * | 9/1961 | Rast | B21D 39/20 72/393 |

(Continued)

FOREIGN PATENT DOCUMENTS

| | | |
|---|---|---|
| CN | 200970605 Y | 11/2007 |
| CN | 201346601 Y | 11/2009 |

(Continued)

OTHER PUBLICATIONS

Electric bender ROBEND® 4000 set, *Rothenberger ROBEND* , accessed Nov. 18, 2020, 3 pages.

(Continued)

*Primary Examiner* — Seyed Masoud Malekzadeh
(74) *Attorney, Agent, or Firm* — Patterson Thuente Pedersen, P.A.

(57) ABSTRACT

An expansion toolhead configured to enable the expansion of multiple different sized diameters of cross-linked polyethylene (PEX) tubing with a single expansion toolhead. The expansion toolhead including a cap operably coupled to an expansion tool, and a plurality of jaws forming a 360 degree jaw section operably coupled to the cap, each of the plurality of jaws including an expansion tool interface portion forming a conical recess enabling a cone-shaped wedge of the expansion tool to move the jaw section between an unexpanded position and an expanded position, and a PEX tubing interface portion having a distal end, a proximal end and a plurality of lands positioned therebetween configured to form a corresponding plurality of substantially uniform diameter portions of the jaw section sequentially increasing in diameter between the distal end and the proximal end for the expansion of multiple different standard sized diameters of VEX tubing.

20 Claims, 9 Drawing Sheets

(56) References Cited

U.S. PATENT DOCUMENTS

| | | | | |
|---|---|---|---|---|
| 3,248,756 A * | 5/1966 | Mills | ............... | B29C 57/04 425/392 |
| 3,550,424 A * | 12/1970 | Rast | ............... | B21D 41/026 72/399 |
| 4,034,591 A * | 7/1977 | Rothenberger | ...... | B21D 41/026 72/393 |
| 4,063,862 A * | 12/1977 | Johansson | ............... | B29C 57/04 425/392 |
| 4,144,735 A * | 3/1979 | Rothenberger | ...... | B21D 41/026 206/372 |
| 4,154,083 A * | 5/1979 | Rothenberger | ...... | B21D 41/026 72/393 |
| 4,386,045 A * | 5/1983 | Vaisanen | ............... | F16L 47/08 264/249 |
| 4,735,078 A * | 4/1988 | Wesebaum | ............ | B21D 41/026 72/393 |
| 4,880,579 A * | 11/1989 | Murata | ............... | B29C 57/00 264/403 |
| 4,890,472 A * | 1/1990 | Rothenberger | ...... | B21D 41/026 72/393 |
| 5,046,349 A * | 9/1991 | Velte | ............... | B21D 41/026 72/393 |
| 5,056,347 A | 10/1991 | Wagner | | |
| 5,090,230 A * | 2/1992 | Koskinen | ............ | B21D 41/026 72/393 |
| 5,243,845 A * | 9/1993 | Velte | ............... | B21D 41/026 72/393 |
| 5,301,530 A | 4/1994 | Beelen et al. | | |
| 5,653,935 A * | 8/1997 | Hållstedt | ............... | B29C 57/025 264/516 |
| 5,744,085 A | 4/1998 | Sörberg | | |
| 6,026,668 A | 2/2000 | Oda et al. | | |
| 6,220,846 B1 * | 4/2001 | Savioli | ............... | B29B 13/025 264/230 |
| 6,457,966 B1 * | 10/2002 | Savioli | ............... | B29C 57/04 425/389 |
| 6,832,502 B1 * | 12/2004 | Whyte | ............... | B21K 21/12 72/318 |
| 6,862,766 B2 | 3/2005 | Geurts | | |
| 7,059,162 B1 | 6/2006 | Tarpill et al. | | |
| 7,128,560 B2 | 10/2006 | Tandart | | |
| 7,922,475 B2 | 4/2011 | Gueit | | |
| 8,438,955 B2 | 5/2013 | Wilson, Jr. et al. | | |
| 8,517,715 B2 * | 8/2013 | Thorson | ............... | B29D 23/001 425/392 |
| 8,801,424 B2 * | 8/2014 | Lindner | ............... | B21D 39/20 425/393 |
| 9,248,617 B2 * | 2/2016 | Lundequist | ............ | B21D 41/02 |
| 9,555,577 B2 * | 1/2017 | Greding | ............... | B21D 39/20 |
| 9,862,137 B2 * | 1/2018 | Dickert | ............... | B29C 57/045 |
| 9,914,260 B2 * | 3/2018 | Ellice | ............... | B29C 57/04 |
| 9,943,949 B2 | 4/2018 | Greding et al. | | |
| 9,993,961 B2 * | 6/2018 | Dickert | ............... | B29C 57/045 |
| 10,000,007 B2 * | 6/2018 | Dickert | ............... | B29C 57/04 |
| 10,195,783 B2 | 2/2019 | Dickert et al. | | |
| 2004/0251035 A1 * | 12/2004 | Simpson | ............... | E21B 43/105 166/384 |
| 2006/0201228 A1 | 9/2006 | Rothenberger | | |
| 2008/0160130 A1 * | 7/2008 | Gueit | ............... | B21D 39/20 425/393 |
| 2008/0190164 A1 | 8/2008 | Boon et al. | | |
| 2009/0188291 A1 | 7/2009 | Itrich et al. | | |
| 2011/0000273 A1 | 1/2011 | Latoria | | |
| 2011/0239425 A1 * | 10/2011 | Thorson | ............... | B21D 41/026 29/243.518 |
| 2012/0181727 A1 * | 7/2012 | Lindner | ............... | B21D 39/20 264/288.4 |
| 2013/0140739 A1 * | 6/2013 | Lundequist | ............ | B21D 41/02 264/312 |
| 2014/0157568 A1 * | 6/2014 | Hennemann | ......... | B29D 23/003 29/428 |
| 2015/0128644 A1 | 5/2015 | Sarac | | |
| 2018/0281272 A1 | 10/2018 | Dickert et al. | | |
| 2020/0094465 A1 * | 3/2020 | Lindsey | ............... | B29C 57/04 |

FOREIGN PATENT DOCUMENTS

| | | | |
|---|---|---|---|
| CN | 201644657 U | 11/2010 | |
| CN | 203470706 U | 3/2014 | |
| CN | 205414182 U | 8/2016 | |
| CN | 106077300 A | 11/2016 | |
| CN | 206677054 U | 11/2017 | |
| CN | 207563602 U | 7/2018 | |
| DE | 1552050 A1 | 9/1970 | |
| DE | 1752461 B2 | 5/1971 | |
| DE | 2552607 A1 | 6/1977 | |
| DE | 4319591 A1 | 10/1994 | |
| DE | 202009010896 U1 | 12/2009 | |
| EP | 0350457 A2 | 1/1990 | |
| EP | 2090385 A2 | 8/2009 | |
| EP | 2558230 B1 | 2/2013 | |
| EP | 2682253 A1 * | 1/2014 | ............ B21D 41/02 |
| KR | 10-2017-0131903 A | 12/2017 | |
| WO | WO 2017/129540 A1 | 8/2017 | |

OTHER PUBLICATIONS

Teal Corporation, Bending, *REMS Curvo*, accessed Nov. 18, 2020, 4 pages.

Portable Cyclone, *Gardner Bender Portable Cyclone*, accessed Nov. 18, 2020, 5 pages.

PCT Search Report dated Nov. 6, 2020 for PCT Application No. PCT/US2020/043190, 11 pages.

* cited by examiner

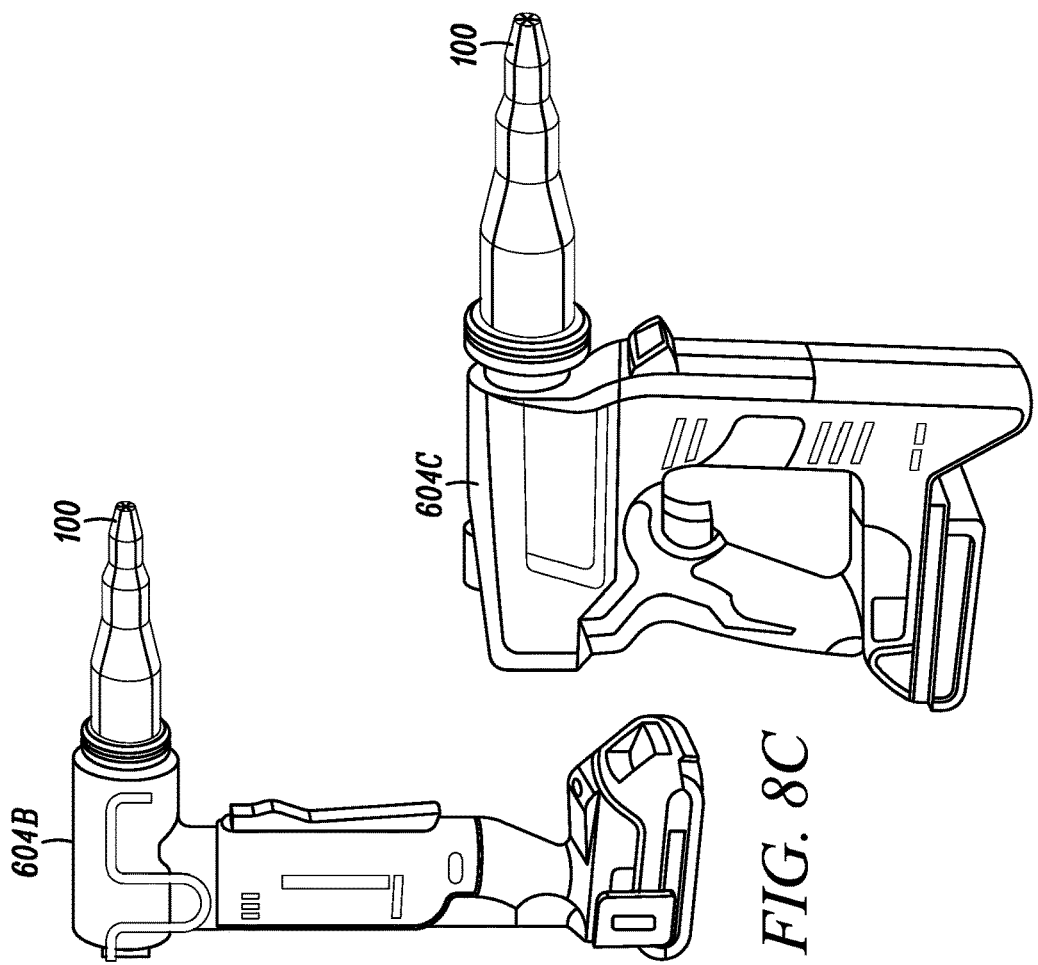
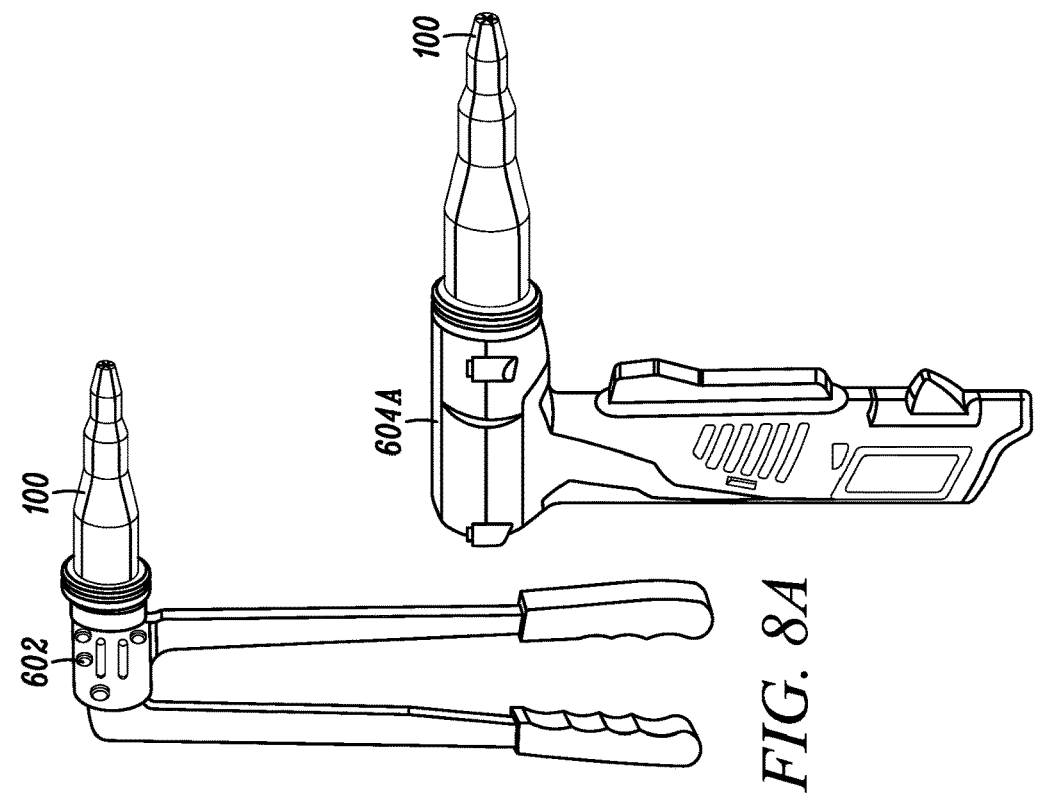
FIG. 8D
FIG. 8C
FIG. 8B
FIG. 8A

PEX TUBING EXPANDER HEAD

TECHNICAL FIELD

The present disclosure relates generally to pipe and tubing expansion tools and methods, and more particularly to a cross-linked polyethylene (PEX) expansion toolhead configured to expand multiple different standard sized diameters of PEX tubing.

BACKGROUND

Cross-linked polyethylene, commonly known as PEX tubing, is a type of flexible plastic tubing often used in plumbing, geothermal and fire protection systems of residential and commercial construction. Frequently, PEX tubing, which generally costs about one-third of the equivalent copper pipe, is a substitute for copper and other more expensive plumbing options. Besides being less expensive, PEX tubing is also desirable because of its ease in installation.

One aspect that makes PEX tubing easy to install is its flexibility. As opposed to rigid pipe which generally comes in 10 foot sections, PEX tubing can be stored on a spool in lengths of up to 500 feet. During installation, PEX tubing can be uncoiled and pulled around corners and through offset openings, which would otherwise require a fitting or connection between sections of rigid pipe at each bend. Fewer fittings and connections translates to quicker installation (e.g., no soldering of joints at every corner), as well as fewer points of potential failure. As an added benefit, because of its flexibility, PEX tubing is resistant to fracturing if the liquid within the tubing should expand or freeze. For these reasons, today PEX tubing is installed in more new construction homes than copper and PVC tubing.

A fitting or connection between sections of PEX tubing is established by expanding one end of the tube, inserting a connector into the expanded portion of the tube, and retaining the connector in the expanded portion until a natural resiliency of the PEX tubing causes the expanded portion to shrink, thereby retaining the connector in position. Optionally, a clamping sleeve is expanded and shrunk over the tube end, in order to further enhance connection between the PEX tubing and connector. In some cases, the clamping sleeve can be expanded around the tube end at the same time as the tube end is expanded.

The ends of PEX tubing are typically expanded with an expander tool. Both manual and powered expander tools exist. One example of a manual PEX expander is described in U.S. Pat. No. 6,862,766, the contents of which are hereby incorporated by reference to the extent that they do not contradict the teachings herein. Common manufacturers of manual PEX expanders include Iwiss®, Ridgid® and Uponor®. One example of a powered PEX expander is described in U.S. Pat. No. 8,517,715, the contents of which are hereby incorporated by reference to the extent that they do not contradict the teachings herein. Common manufacturers of powered PEX expanders include Milwaukee Tool® and DeWalt®.

PEX tubing comes in a variety of standard size diameters, ranging from ⅜ inch up to 3 inches. With manual and powered expanders, each size of PEX tubing has its own toolhead, specifically shaped and sized to expand the PEX tubing the amount necessary to create a fitting (e.g., an expansion in diameter of about 3/16 inch). These toolheads can be purchased individually, or as a set of toolheads. On average, each toolhead costs between about $45 and about $60. Typically the different sized toolheads are color-coded to aid in their identification (e.g., blue for ½ inch toolheads, green for ¾ inch toolheads, red for 1 inch toolheads, etc.).

Referring to FIGS. 1A and 1B, an expansion toolhead 50 is depicted in accordance with the prior art. Such expansion toolheads 50 are often threadably coupleable to an expansion tool 52, such as a manual or powered expansion tool, via a cap 54. Typically the expansion toolheads 50 include a plurality of jaws 56 forming a 360 degree jaw section 58. Both manual and powered expansion tools 52 use a cone-shaped wedge 60 to expand the jaw section 58 between an unexpanded position (as depicted in FIG. 1A) and an expanded position (as depicted in FIG. 1B).

Manual PEX expanders generally include a ratcheting mechanism to incrementally expand the toolheads. Powered PEX expanders, by contrast, utilize a motor and cam system to rapidly expand and contract the toolhead during use. For example, some powered PEX expanders cycle the toolhead at about 60 expansions per minute. Additionally, to promote a more even expansion of the PEX tubing, powered PEX expanders often rotate the toolhead slightly on each retraction stroke, such that the toolhead rotates with respect to the PEX tubing while it is expanding and retracting.

In residential construction, a plumbing system will typically use a combination of ½ inch, ¾ inch and 1 inch PEX tubing. Accordingly, a plumber working on such a job would need to carry three different sized toolheads (i.e., a ½ inch, ¾ inch, and 1 inch toolhead). As a typical bathroom, kitchen or utility room frequently includes all three sizes of PEX tubing, the plumber must continually switch between toolheads, which requires unscrewing the toolhead currently on the expander, storing the toolhead in a clean place, locating the desired toolhead, and screwing the desired toolhead onto the expander.

Although the individual steps for removing and replacing a toolhead are not complicated, over the course of the day, the time spent switching toolheads can add up to a significant amount. As a further complication, because the toolheads are in contact with the inside of water lines, the toolheads must be kept clean and free from the dirt and grime common to the construction environment. Even worse, misplaced or lost toolheads in the often dark and cramped workspaces can force the temporary halt of work on the plumbing system. As a result, the productivity in the building of plumbing and other systems that use PEX tubing continues to suffer. Unfortunately, no advances to address these concerns have been made in nearly a decade.

SUMMARY OF THE DISCLOSURE

Embodiments of the present disclosure provide a single toolhead configured to enable the expansion of multiple different standard size diameters of PEX tubing, thereby eliminating the need to remove and replace the toolhead when expanding different sizes of PEX tubing. Accordingly, embodiments of the present disclosure enable the replacement of a set of toolheads with a single toolhead. In some embodiments, the toolhead can be threadably coupled as an aftermarket feature to existing expansion tools, such as expansion tools manufactured by Iwiss® and Ridgid®, Milwaukee Tool®, DeWalt® and Uponor®. In other embodiments, the toolhead can be included as an integral component of an expansion tool, without a threaded coupling portion, thereby enabling the construction of a more compact toolhead.

One embodiment of the present disclosure provides an expansion toolhead for an expansion tool. The expansion toolhead can include a cap operably coupled to the expansion tool, and a plurality of jaws forming a 360 degree jaw section operably coupled to the cap. Each of the plurality of jaws can include an expansion tool interface portion forming a conical recess enabling a cone-shaped wedge of the expansion tool to move the jaw section between an unexpanded position and an expanded position, and a cross-linked polyethylene (PEX) tubing interface portion having a distal end, a proximal end and a plurality of lands positioned therebetween configured to form a corresponding plurality of substantially uniform diameter portions of the jaw section sequentially increasing in diameter between the distal end and the proximal end for the expansion of multiple different standard size diameters of PEX tubing.

In one embodiment, the jaw section includes at least six jaws. In one embodiment, the PEX tubing interface portion of each of the plurality of jaws includes a roughened surface configured to grip an inside of the PEX tubing during expansion. In one embodiment each of the plurality of jaws includes a magnet configured to inhibit separation of the jaw section from the cone-shaped wedge. In one embodiment, each of the plurality of jaws includes one or more biasing members at least partially encircling the jaw section to bias the jaw section to the unexpanded position. In one embodiment each of the plurality of jaws includes a pair of biasing members. In one embodiment each of the plurality of jaws includes an expansion tool slot configured to interface with a portion of the expansion tool to at least partially rotate the jaw section relative to the expansion tool during operation.

In one embodiment, each of the plurality of jaws includes at least two lands sized for the expansion of at least two different standard size diameters of PEX tubing. In one embodiment, a first land is sized for the expansion of ½ inch PEX tubing, and a second land is sized for the expansion of ¾ inch PEX tubing. In one embodiment, each of the plurality of jaws includes a first ramp portion positioned in proximity to the distal end. In one embodiment, each of the plurality of jaws includes a second ramp portion positioned between the first land and the second land. In one embodiment, the first ramp portion has a steeper angle with respect to a centerline of the toolhead than the second ramp portion. In one embodiment, the first ramp portion and the second ramp portion have substantially the same angle with respect to a centerline of the toolhead.

In one embodiment, each of the plurality of jaws includes at least three lands sized for the expansion of at least three different standard size diameters of PEX tubing. In one embodiment, a first land is sized for the expansion of ½ inch PEX tubing, a second land is sized for the expansion of ¾ inch tubing, and a third land is sized for the expansion of 1 inch PEX tubing. In one embodiment, each of the plurality of jaws includes a first ramp portion positioned in proximity to the distal end. In one embodiment, each of the plurality of jaws includes a second ramp portion positioned between the first land and the second land, and a third ramp portion positioned between the second land and the third land. In one embodiment, the first ramp portion has a steeper angle with respect to a centerline of the toolhead than the second ramp portion, and the second ramp portion has a steeper angle with respect to a centerline of the toolhead than the third ramp portion. In one embodiment, the first ramp portion, the second ramp portion, and the third ramp portion have substantially the same angle with respect to a centerline of the toolhead.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 8A is an expansion toolhead operably coupled to a manual expansion tool, in accordance with an embodiment of the disclosure.

FIGS. 8B-D are expansion toolheads operably coupled to powered expansion tools, in accordance with embodiments of the disclosure.

Figure 1A:
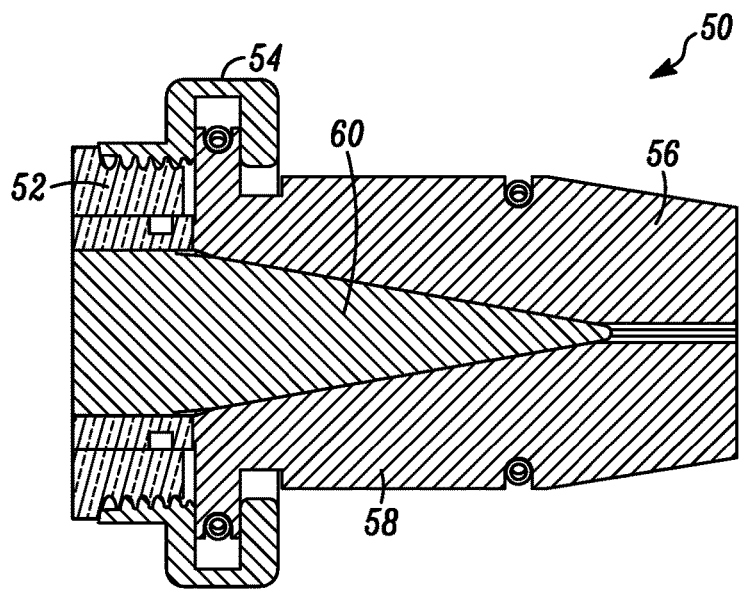
FIG. 1A is a partial, cross-sectional view depicting an expansion toolhead operably coupled to an expansion tool in an unexpanded position, in accordance with the prior art.
Figure 1B:
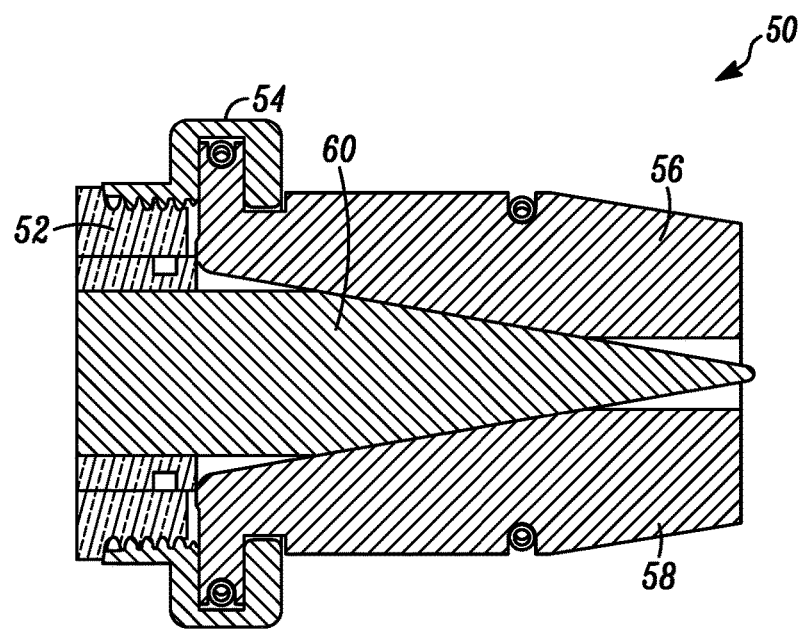
FIG. 1B is a partial, cross-sectional view depicting the expansion toolhead of FIG. 1A in an expanded position.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2A:
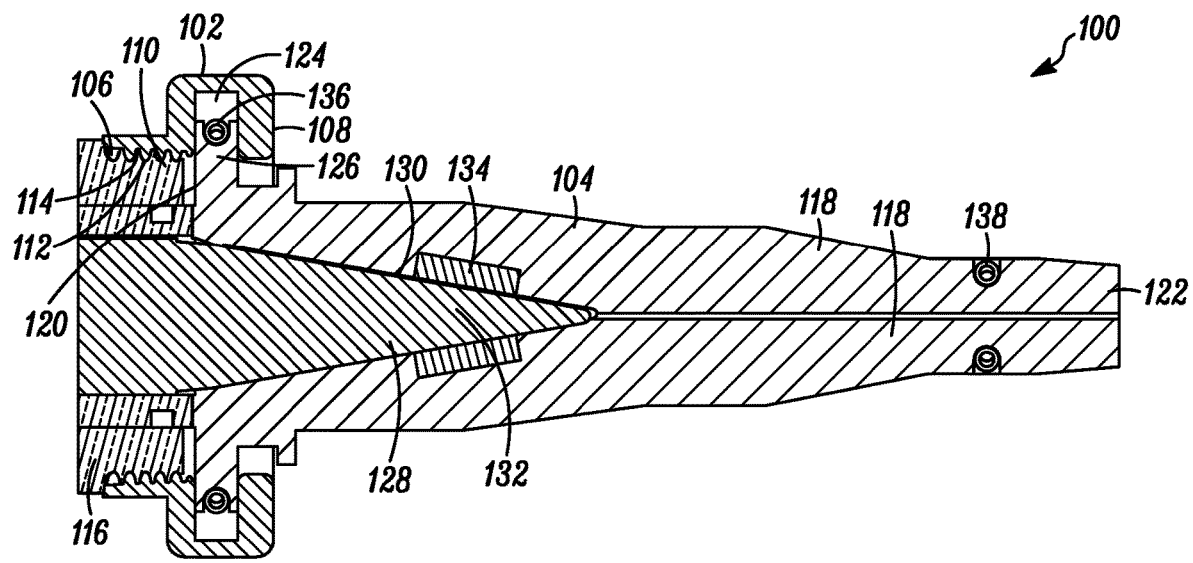
FIG. 2A is a partial, cross-sectional view depicting an expansion toolhead operably coupled to an expansion tool in an unexpanded position, in accordance with an embodiment of the disclosure.
Figure 2B:
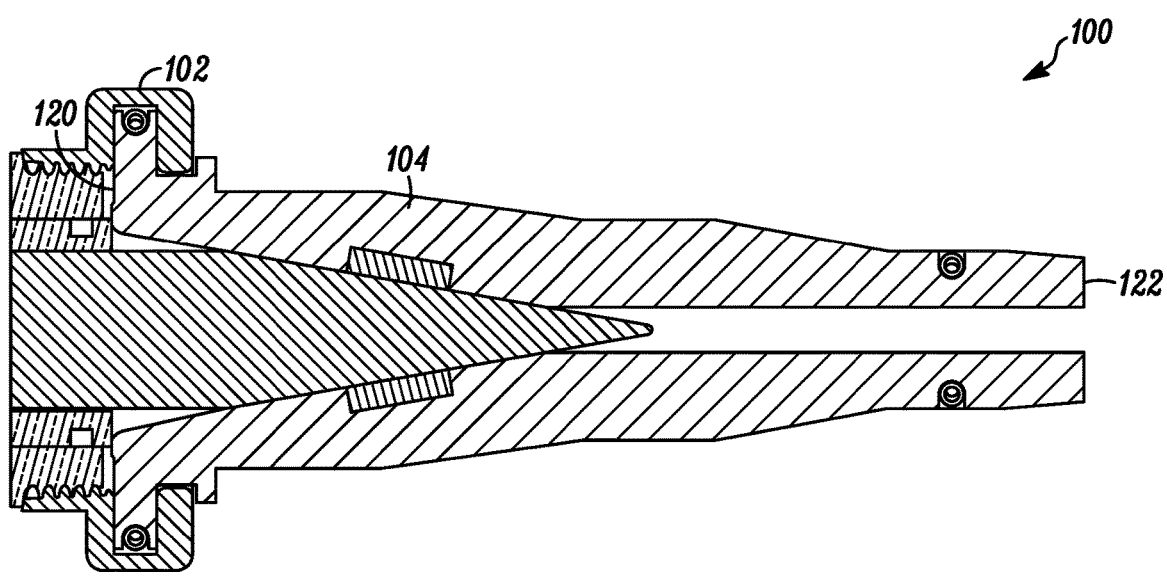
FIG. 2B is a partial, cross-sectional view depicting the expansion toolhead of FIG. 2A in an expanded position.

Referring to FIGS. 2A-B, a cross-sectional view of an expansion toolhead 100 is depicted in accordance with an embodiment of the disclosure. The expansion toolhead 100 can include a cap 102 and a plurality of jaws 104. In one embodiment, the cap 102 can include a proximal end 106, a distal end 108 and a wall 110 traversing therebetween defining an inner aperture 112. In some embodiments, the inner aperture 112 can include a threaded portion 114 in proximity to the proximal end 106, thereby enabling the expansion toolhead 100 to be selectively coupleable to an expansion tool 116. For example, in one embodiment, the expansion toolhead 100 can be threadedly coupled to one of the manual or powered expansion tools described in the background section. In other embodiments, the cap 102 can be fixedly coupled to the expansion tool 116, such that the expansion toolhead 100 is included as an integral component of the expansion tool 116.

The plurality of jaws 104 can collectively form a 360 degree jaw section 118. In one embodiment, the jaw section 118 includes at least six jaws 104, although other numbers of jaws are also contemplated. For example, in one embodiment, the expansion toolhead 100 can include as few as two jaws 104 or as many as ten or more jaws 104. Each of the plurality of jaws 104 can include a proximal end 120 and a distal end 122. The plurality of jaws 104 can be operably coupled to the cap 102 in proximity to their respective proximal end 120. For example, in one embodiment, the inner aperture 112 of the cap 102 can define a radial slot 124 configured to receive a radial extension 126 of each of the plurality of jaws 104.

Each of the plurality of jaws 104 can include an expansion tool interface portion 128 forming a conical recess 130, thereby enabling a cone-shaped wedge 132 of the expansion tool 116 to move the jaw section 118 between an unexpanded position (as depicted in FIG. 2A) and an expanded position (as depicted in FIG. 2B). In one embodiment, each of the plurality of jaws 104 can include a magnet 134 configured to inhibit separation of the jaw section 118 from the cone-shaped wedge 126. In one embodiment, a biasing member 136, such as an elastic band or spring, can at least partially encircle the jaw section 118 at a proximal end 120 of the plurality of jaws 104, thereby biasing the jaw section 118 to the unexpanded position. In one embodiment, a biasing member 138 can be positioned distally along the jaw section 118 and at least partially encircle the jaw section 118, thereby biasing the jaw section 118 to the unexpanded position. Various combinations of the magnet 134 and biasing members 136, 138 are contemplated.

Figure 3:
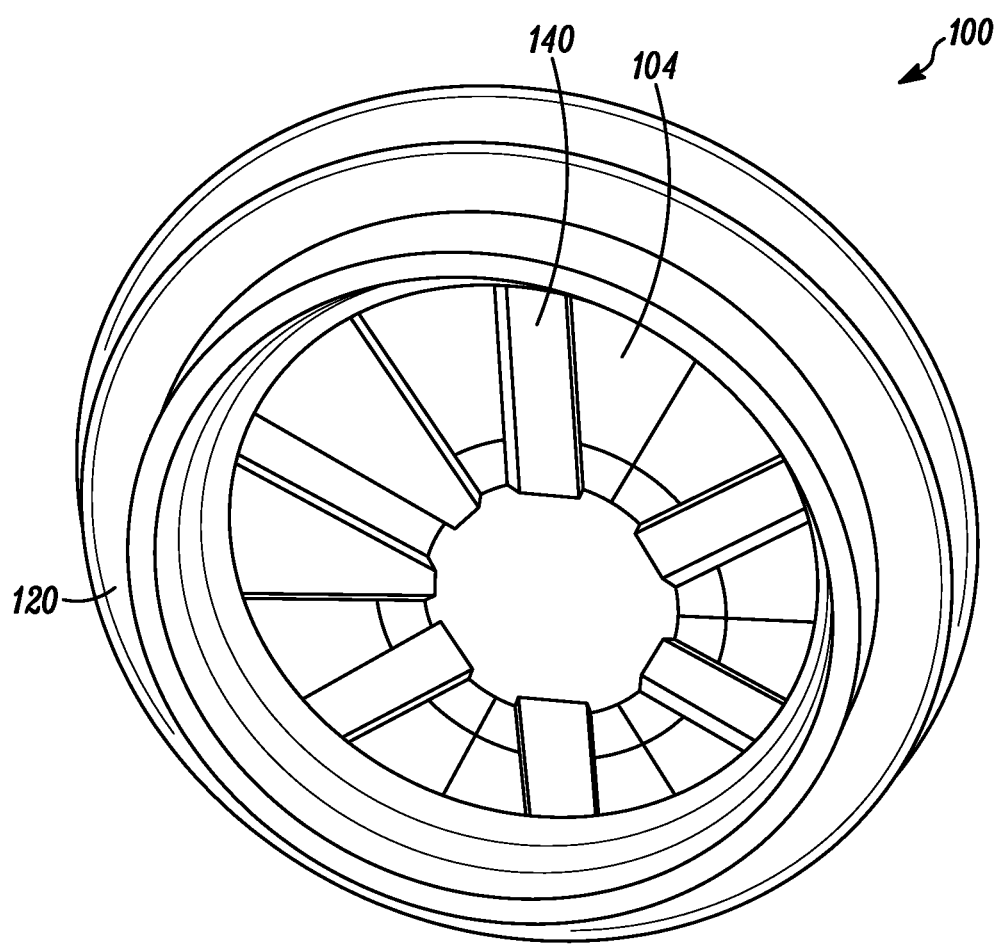
FIG. 3 is a perspective view depicting a proximal end of an expansion toolhead, in accordance with an embodiment of the disclosure.

Referring to FIG. 3, the proximal end 120 of the expansion toolhead 100 is depicted in accordance with an embodiment of the disclosure. In one embodiment, each of the plurality of jaws 104 includes an expansion tool slot 140 configured to interface with a portion of the expansion tool 116 to at least partially rotate the jaw section 118 relative to the expansion tool 116 during operation. For example, in one embodiment, the expansion tool slot 140 can be defined on the proximal end 120 of the radial extension 126 of each of the plurality of jaws 104. In some embodiments, manipulation of the expansion tool slot 140 can cause the expansion toolhead 100 to incrementally rotate in either a clockwise or counterclockwise rotation during each expansion and contraction cycle of the expansion toolhead 100. In other embodiments, manipulation of the expansion tool slot 140 can cause the expansion toolhead 100 to ratchet back and forth between a clockwise and counterclockwise rotation during each expansion and contraction cycle of the expansion toolhead 100.

Figure 4A:
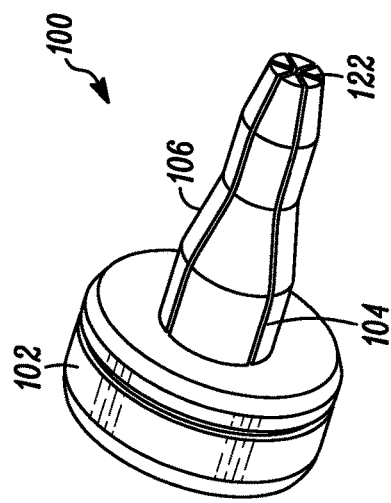
FIG. 4A is a perspective view depicting an expansion toolhead having two lands, in accordance with an embodiment of the disclosure.
Figure 4C:
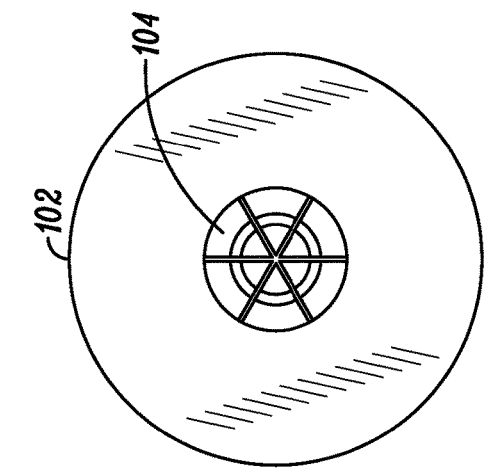
FIG. 4C is an end view depicting the expansion toolhead of FIG. 4B.
Figure 4B:
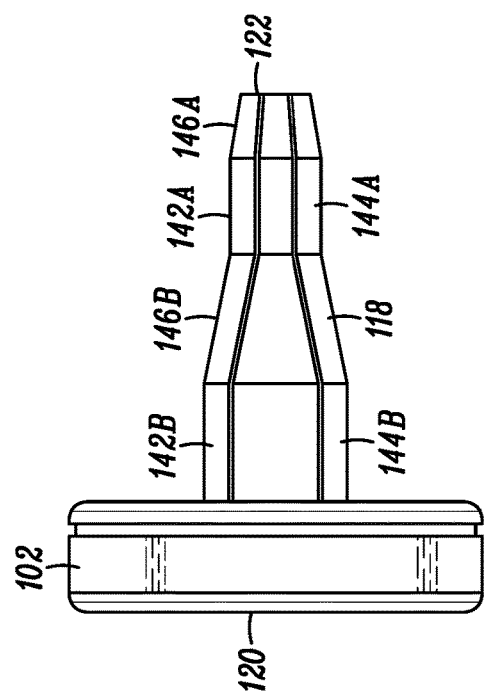
FIG. 4B is a profile view depicting the expansion toolhead of FIG. 4A.

Referring to FIGS. 4A-C, in one embodiment, each of the plurality of jaws 104 can include a PEX tubing interface portion including a plurality of lands 142A, 142B configured to form a corresponding plurality of substantially uniform diameter portions 144A, 144B of the jaw section 118. In one embodiment, the substantially uniform diameter portions 144A, 144B can vary in their uniformity slightly across their length, thereby allowing for some tolerance in diameter variability. The plurality of substantially uniform diameter portions 144A, 144B can sequentially increase in diameter between the distal end 122 and the proximal end 120 for the expansion of multiple different standard sized diameters of PEX tubing. Accordingly, embodiments of the present disclosure provide a single toolhead 100 configured to enable the expansion of multiple different standard sized diameters of PEX tubing, thereby eliminating the need to remove and replace toolheads when expanding different sizes of PEX tubing.

As depicted in FIGS. 4A-C, in one embodiment, each of the plurality of jaws 104 can include at least two lands 142A, 142B for the expansion of at least two different standard sized diameters of PEX tubing. In one embodiment, the first land 142A can be sized for the expansion of ½ inch PEX tubing, and the second land 142B can be sized for the expansion of ¾ inch tubing. Alternatively, the first land 142A can be sized to expand PEX tubing having a size designation of between ⅜ inch and 1 inch, and the second land 142B can be sized to expand PEX tubing having any larger size designation.

It is recognized that the measurable internal and external diameters of PEX tubing may differ slightly from its given size designation (e.g., the internal/external diameter of ⅜ inch PEX tubing may not measure exactly ⅜ inch). Embodiments of the present disclosure preferably are compatible with standard sized PEX tubing designations (e.g., ⅜, inch, ½ inch, ⅝ inch, ¾ inch, 1 inch, 1¼ inch, etc.) regardless of the actual dimensions of the PEX tubing. It is also contemplated that the expansion toolhead 100 can be utilized to expand other types of resilience tubing, hose and pipe, which may or may not conform to the designated sizes of PEX tubing.

Figure 5A:
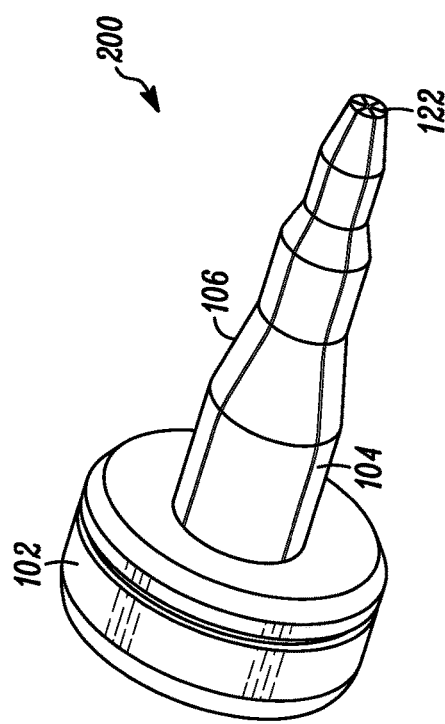
FIG. 5A is a perspective view depicting an expansion toolhead having three lands, in accordance with an embodiment of the disclosure.
Figure 5C:
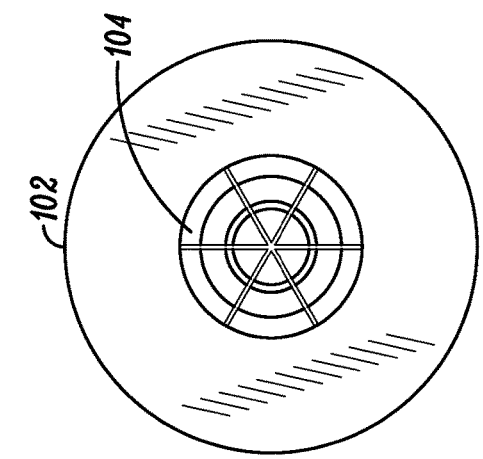
FIG. 5C is an end view depicting the expansion toolhead of FIG. 5B.
Figure 5B:
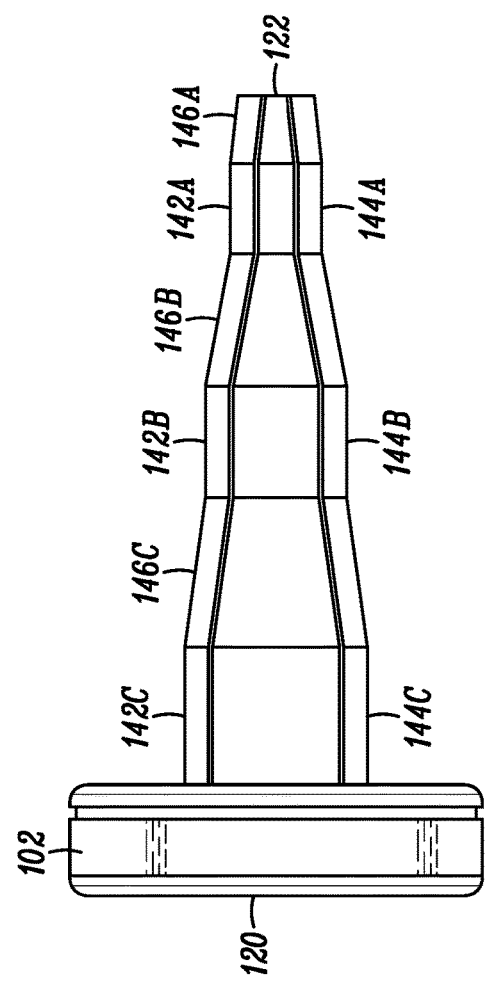
FIG. 5B is a profile view depicting the expansion toolhead of FIG. 5A.

Referring to FIGS. 5A-C, in another embodiment of an expansion toolhead 200, each of the plurality of jaws 104 can include at least three lands 142A, 142B, and 142C configured to form a corresponding plurality of uniform diameter portions 144A, 144B, and 144C of the jaw section 118 for the expansion of at least three different standard sized diameters of PEX tubing. In one embodiment, the first land 142A can be sized for the expansion of ½ inch PEX tubing, the second land 142B can be sized for the expansion of ¾ inch tubing, and the third land 142C can be sized for the expansion of 1 inch tubing. Alternatively, the first land 142A can be sized to expand PEX tubing having a single size designation, and the second and third lands 142B, 142C can be sized to expand PEX tubing having any sequential or non-sequential larger size designations.

In some embodiments, a gradual transition can be positioned between the distal end 122 of the jaw section 118 and the first land 142A, as well as between the various lands 142A, 142B and 142C, thereby enabling a more gradual expansion of the PEX tubing during expansion operations. For example, referring to FIG. 6A, in one embodiment, each of the plurality of jaws 104 can include a first ramp portion 146A positioned in proximity to the distal end 122 of the expansion toolhead 300. In particular, the first ramp portion 146A can provide a gradual transition between a distal end 122 of the expansion tool 300 and the first land 142A, thereby enabling an insertion of the toolhead 300 into the end of PEX tubing when an inner diameter of the PEX tubing is smaller than the diameter of the unexpanded first land 142A.

In one embodiment, each of the plurality of jaws 104 can include a second ramp 146B positioned between the first land 142A and the second land 142B. Where a third land 142C is present, each of the plurality of jaws 104 can include a third ramp 146C positioned between the second land 142B and the third land 142C. Additional ramps can be included where one or more subsequent lands are present, thereby providing a gradual transition up to the subsequent land.

In some embodiments, portions of the various ramps 146A, 146B and 146C can have a roughened surface configured to grip inside of the PEX tubing during expansion. For example, in one embodiment, one or more of the ramps 146A, 146B and 146C can include a plurality of ribs 147 circumferentially inscribed into a portion of the exterior of the jaw section 118, thereby inhibiting PEX tubing from being inadvertently pushed off of the expansion toolhead during expansion operations. Other roughened surfaces, such as stippling, surface treatments or coatings are also contemplated. In one embodiment, the roughened surface can further be included on the various lands 142A, 142B and 142C.

Figure 6A:
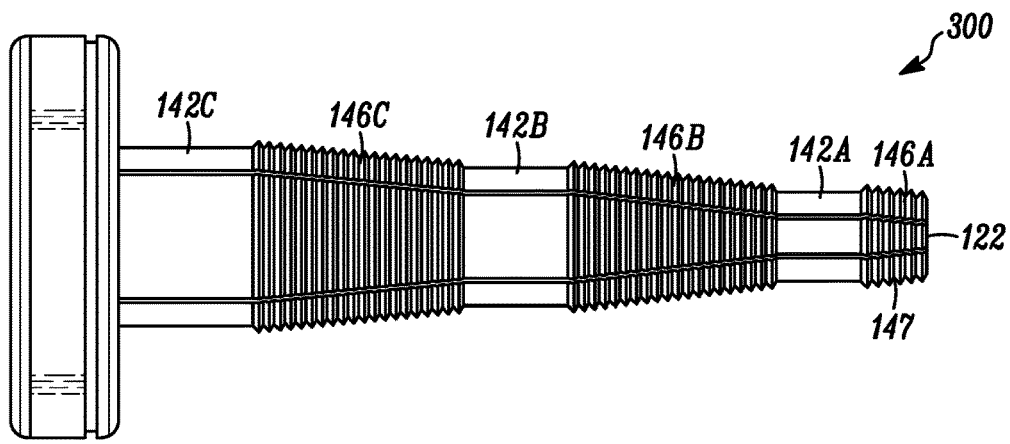
FIG. 6A is an expansion toolhead including ramps of an equal angle with respect to a centerline of the toolhead, in accordance with an embodiment of the disclosure.
Figure 7A:
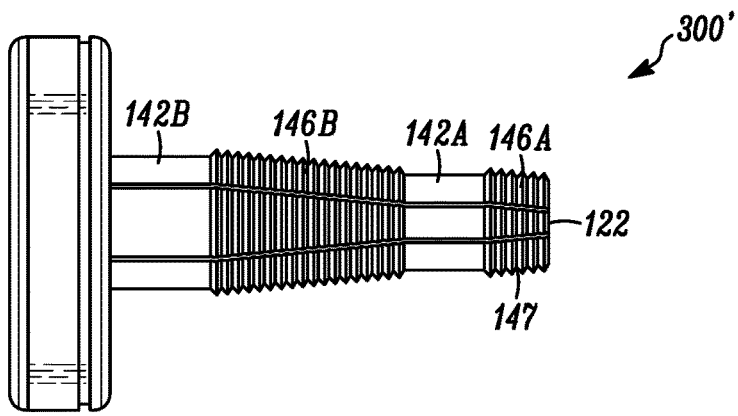
FIG. 7A is an expansion toolhead including ramps of an equal angle with respect to a centerline of the toolhead, in accordance with an embodiment of the disclosure.

As depicted in FIG. 6A, in some embodiments, the first ramp 146A, second ramp 146B and third ramp 146C can all share the same pitch or angle with respect to a centerline of the toolhead. In other embodiments, the pitch or angle with respect to a centerline of the toolhead can vary between the various ramps 146A, 146B and 146C. For example, in order to minimize the larger expansion forces generally required to expand larger diameter/sizes of PEX tubing, the ramps can be made more gradual (e.g., at a shallower angle) in proximity to larger diameter lands, as a result, the second ramp portion comprises a shallower angle with respect to the centerline of the toolhead than the first ramp portion A similar two-step embodiment is depicted in FIG. 7A.

Figure 6B:
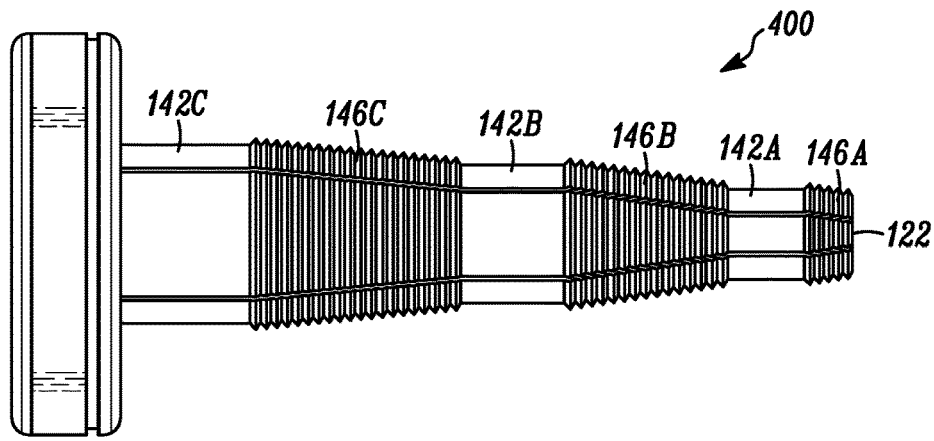
FIG. 6B is an expansion toolhead including ramps of an increasing angle with respect to a centerline of the toolhead, in accordance with an embodiment of the disclosure.
Figure 7B:
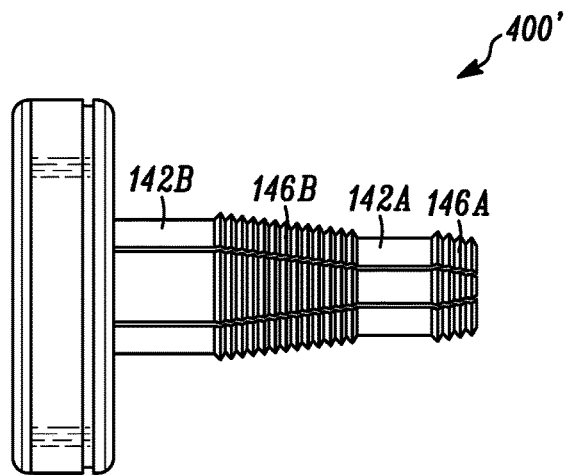
FIG. 7B is an expansion toolhead including ramps of an increasing angle with respect to a centerline of the toolhead, in accordance with an embodiment of the disclosure.

As depicted in FIG. 6B, the first ramp 146A can have a steeper pitch than the second ramp 146B, and a second ramp 146B can have a steeper pitch than the third ramp 146C. One notable advantage to this approach is that it tends to reduce the overall length of the expansion toolhead 400, thereby reducing the bulk and weight of the device, which presents both lower-cost manufacturing and ease-of-use advantages. In other embodiments, the ramps can have a variable pitch or angle with respect to a centerline of the toolhead, which can be based in part on the expansion forces generally required to expand PEX tubing of a given diameter. A similar two-step embodiment is depicted in FIG. 7B.

Figure 6C:
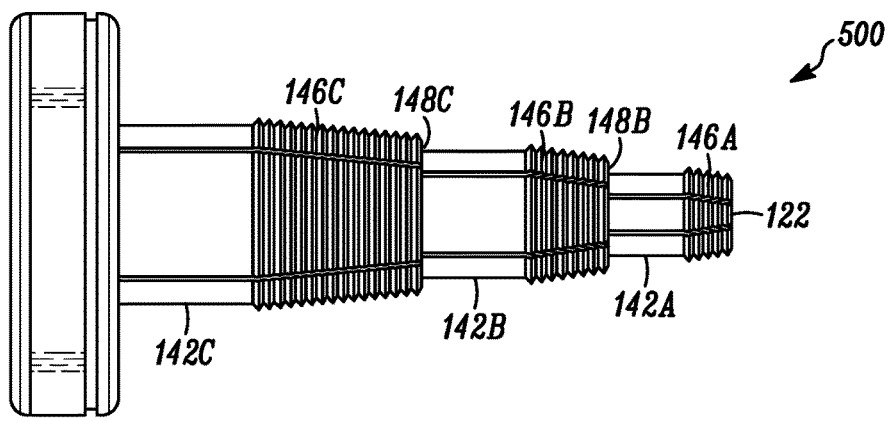
FIG. 6C is an expansion toolhead including a combination of risers and ramps, in accordance with an embodiment of the disclosure.
Figure 7C:
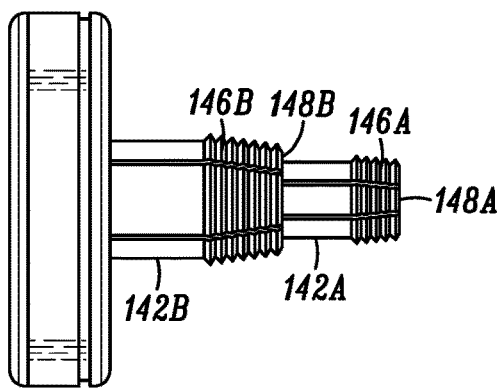
FIG. 7C is an expansion toolhead including a combination of risers and ramps, in accordance with an embodiment of the disclosure.

In order to further reduce the overall length of the expansion tool, in yet another embodiment, a combination riser and ramp can be provided between the various lands. For example as depicted in FIG. 6C, a riser 148B can be positioned immediately proximal to the first land 142A. Second ramp 146B can be positioned proximally to the riser 148B to provide a gradual transition to the second land 142B. Similarly, a riser 148C can be positioned immediately proximal to the second land 142B, and the third ramp 146C can be positioned proximally to the riser 148C to provide a gradual transition to the third land 142C. In some embodiments, the distal end 122 of the toolhead 500 can be considered the first step up 148A. Accordingly, the first ramp 146A can provide a gradual transition from the first step up 148A to the first land 142A. Beside significantly reducing the overall length of the expansion toolhead 500, the risers 148A, 148B and 148C can serve as a natural stop mechanism to inhibit over insertion of the toolhead 500 into the end of PEX tubing during expansion operations, thereby inhibiting inadvertent overexpansion of the and of the PEX tubing. A similar two-step embodiment is depicted in FIG. 7C.

In other embodiments, the gradual expansion of toolheads 300, 400 can be utilized to gradually expand a smaller size of PEX tubing to accommodate a larger size fitting. For example, the end of a ⅜ inch standard sized PEX tubing could be gradually expanded by first inserting the first land 142A into the PEX tubing to allow for normal expansion, followed by the gradual insertion of the ramp 146B leading up to the second land 142B, which in one embodiment could be sized for the normal expansion of ½ inch PEX tubing. Accordingly, through this method a section of ⅜ inch PEX tubing could be directly connected to a ½ inch fitting. Other combinations of sizing expansions are also contemplated.

Embodiments of the stepped expansion toolhead 100, 200, 300, 400 and 500 can be operably coupled to expansion tools. For example, as depicted in FIGS. 8A-D, the stepped expansion toolhead 600 can be operably coupled to a manual expansion tool 602 (e.g., manufactured by Iwiss®, Ridgid® or Uponor®), or a powered expansion tool 604A, 604B and 604C (e.g., manufactured by Milwaukee Tool®, DeWalt®, or Uponor®).

Alternatively, stepped expansion toolheads disclosed herein can be fixedly coupled to an expansion tool as an integral component, thereby potentially eliminating the need to create a threaded coupling between the expansion toolhead and the expansion tool, as well as knurling of the cap 102, which is common among such devices. In particular, where a threaded coupling is utilized, generally the cap must have an overall length sufficient to include at least three consecutive threads to ensure that the toolhead remains coupled to the expansion tool during operation. Additionally, typically power tools of this nature include a course threading, which is wider than find threading, but is less susceptible to cross-threading or stripping in the often dirty environment of a construction site.

Figure 9B:
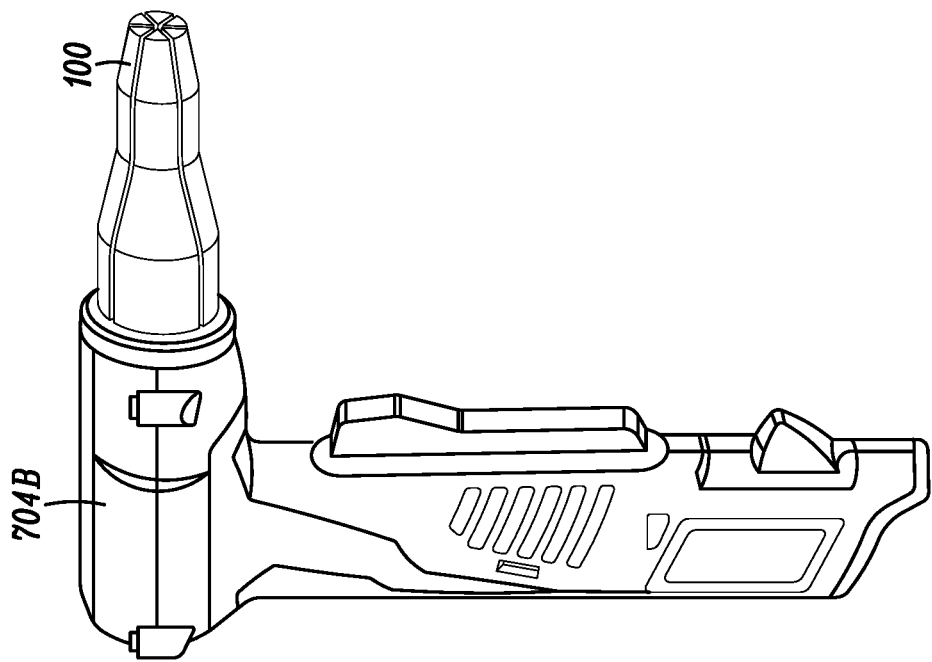
FIG. 9B is an expansion toolhead fixedly coupled to a powered expansion tool, in accordance with an embodiment of the disclosure.
Figure 9A:
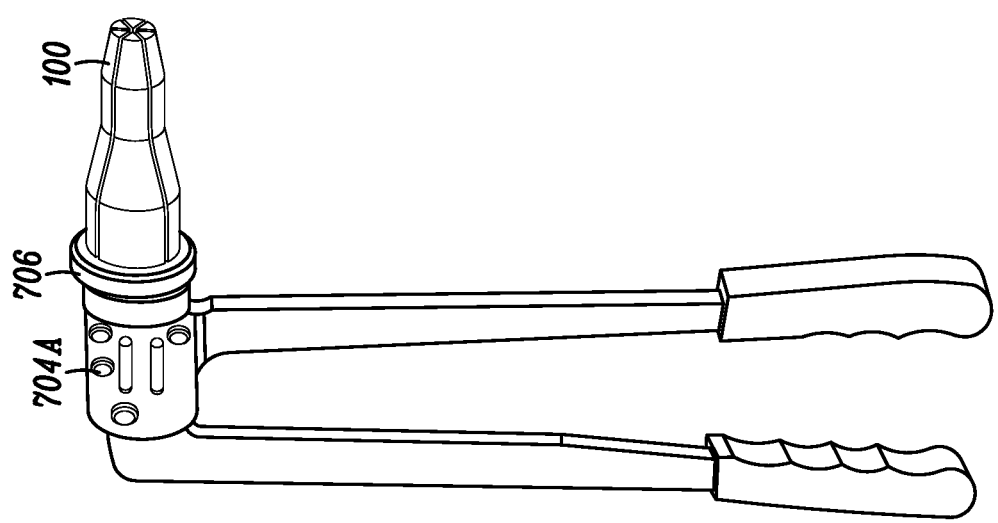
FIG. 9A is an expansion toolhead fixedly coupled to a manual expansion tool, in accordance with an embodiment of the disclosure.

For example, as depicted in FIGS. 9A and 9B, the expansion toolhead 100 can be fixedly coupled to an expansion tool 704A, 704B via a C-clip 706 or other coupling mechanism. Accordingly, including the expansion toolhead 100 as an integral component of the expansion tool 704 can serve to reduce the overall length of the toolhead 100, thereby contributing to a weight and bulk savings which is advantageous in both the reduction of manufacturing costs and promoting a device which is less bulky and easier to use.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An expansion toolhead for an expansion tool, comprising:
    a cap operably coupleable to the expansion tool;
    a plurality of jaws forming a 360 degree jaw section operably coupled to the cap, each of the plurality of jaws including an expansion tool interface portion forming a conical recess enabling a cone-shaped wedge of the expansion tool to move the jaw section between an unexpanded position and an expanded position, and a cross-linked polyethylene PEX tubing interface portion comprises a distal end, a proximal end, at least two lands, including a first land and a second land, positioned therebetween configured to form at least two substantially uniform diameter portions of the jaw section sequentially increasing in diameter between the distal end and the proximal end for an expansion of a respective first predetermined size of PEX tubing and a second, larger predetermined size of PEX tubing, a first ramp portion defining a first gradual transition between the distal end and the first land, a second ramp portion defining a second gradual transition between the first land and the second land, and a riser positioned between the first land and the second ramp portion, wherein the second ramp portion comprises a shallower angle with respect to a centerline of the toolhead than the first ramp portion, and the first ramp portion comprises a steeper pitch than the second ramp portion to reduce an expansion force required to expand the second, larger standard size of PEX tubing, and wherein the riser and a steeper angle of the first ramp portion relative to the second ramp portion reduce the overall length of the expansion toolhead.

2. The expansion toolhead of claim 1, wherein the jaw section includes at least six jaws.

3. The expansion toolhead of claim 1, wherein the PEX tubing interface portion of each of the plurality of jaws includes a roughened surface configured to grip an inside of the PEX tubing during expansion.

4. The expansion toolhead of claim 1, wherein the first land is sized for the expansion of ½ inch PEX tubing, and the second land is sized for the expansion of ¾ inch PEX tubing.

5. The expansion toolhead of claim 1, wherein the PEX tubing interface portion comprises at least three lands sized for the expansion of at least three different sized diameters of the PEX tubing.

6. The expansion toolhead of claim 5, wherein the first land step is sized for the expansion of ½ inch PEX tubing, the second land is sized for the expansion of ¾ inch PEX tubing, and a third land is sized for the expansion of 1-inch PEX tubing.

7. The expansion toolhead of claim 6, wherein each of the plurality of jaws includes a third ramp portion positioned between the second land and the third land.

8. The expansion toolhead of claim 7, wherein the second ramp portion has a steeper angle with respect to a centerline of the toolhead than the third ramp portion.

9. The expansion toolhead of claim 1, wherein each of the plurality of jaws includes a magnet configured to inhibit separation of the jaw section from the cone-shaped wedge.

10. The expansion toolhead of claim 1, wherein each of the plurality of jaws includes one or more biasing members at least partially encircling the jaw section to bias the jaw section to the unexpanded position.

11. The expansion toolhead of claim 1, wherein each of the plurality of jaws includes an expansion tool facing slot configured to interface with a portion of the expansion tool to at least partially rotate the jaw section relative to the expansion tool during operation.

12. A cross-linked polyethylene PEX expansion tool comprising:
    a handheld actuator configured to selectively drive a cone-shaped wedge distally during operation;
    a cap operably coupleable to the handheld actuator;
    a plurality of jaws forming a 360 degree jaw section operably coupled to the cap, each of the plurality of jaws including an expansion tool interface portion forming a conical recess enabling a cone-shaped wedge of the expansion tool to move the jaw section between an unexpanded position and an expanded position, and a cross-linked polyethylene PEX tubing interface portion comprises a distal end, a proximal end, at least two lands, including a first land and a second land, positioned therebetween configured to form at least two substantially uniform diameter portions of the jaw section sequentially increasing in diameter between the distal end and the proximal end for an expansion a respective first predetermined size of PEX tubing and a second, larger predetermined size of PEX tubing, a first ramp portion defining a first gradual transition between the distal end and the first land, a second ramp portion defining a second gradual transition between the first land and the second land, and a riser positioned between the first land and the second ramp portion, wherein the second ramp portion comprises a shallower angle with respect to a centerline of the toolhead than the first ramp portion, and the first ramp portion comprises a steeper pitch than the second ramp portion to reduce an expansion force required to expand the second, larger standard size of PEX tubing, and wherein the riser and a steeper angle of the first ramp portion relative to the second ramp portion reduce the overall length of the expansion toolhead.

13. A powered cross-linked polyethylene PEX expansion tool comprising:
a handheld tool including battery and driver configured to selectively drive a cone-shaped wedge distally during operation;
a cap operably coupleable to the handheld tool;
a plurality of jaws forming a 360 degree jaw section operably coupled to the cap, each of the plurality of jaws including an expansion tool interface portion forming a conical recess enabling a cone-shaped wedge of the expansion tool to move the jaw section between an unexpanded position and an expanded position, and a cross-linked polyethylene PEX tubing interface portion comprises a distal end, a proximal end, at least two lands, including a first land and a second land, positioned therebetween configured to form at least two substantially uniform diameter portions of the jaw section sequentially increasing in diameter between the distal end and the proximal end for an expansion a respective first predetermined size of PEX tubing and a second, larger predetermined size of PEX tubing, a first ramp portion defining a first gradual transition between the distal end and the first land, a second ramp portion defining a second gradual transition between the first land and the second land, and a riser positioned between the first land and the second ramp portion, wherein the first second ramp portion has a steeper shallower angle with respect to a centerline of the toolhead than the first ramp portion, and the first ramp portion comprises a steeper pitch than the second ramp portion to reduce an expansion force required to expand the second, larger standard size of PEX tubing, and wherein the riser and a steeper angle of the first ramp portion relative to the second ramp portion reduce the overall length of the expansion toolhead.

14. The powered cross-linked polyethylene PEX expansion tool of claim 13, wherein the jaw section includes at least six jaws.

15. The powered cross-linked polyethylene PEX expansion tool of claim 13, wherein the PEX tubing interface portion of each of the plurality of jaws includes a roughened surface configured to grip an inside of the PEX tubing during expansion.

16. The powered cross-linked polyethylene PEX expansion tool of claim 13, wherein the first land is sized for the expansion of ½ inch PEX tubing, and the second land is sized for the expansion of ¾ inch PEX tubing.

17. The powered cross-linked polyethylene PEX expansion tool of claim 13, wherein the PEX tubing interface portion comprises at least three lands sized for the expansion of at least three different sized diameters of the PEX tubing, wherein the first land step is sized for the expansion of ½ inch PEX tubing, the second land is sized for the expansion of ¾ inch PEX tubing, and a third land is sized for the expansion of 1 inch PEX tubing.

18. The powered cross-linked polyethylene PEX expansion tool of claim 17, wherein each of the plurality of jaws includes a third ramp portion positioned between the second land and the third land.

19. The powered cross-linked polyethylene PEX expansion tool of claim 18, wherein the second ramp portion has a steeper angle with respect to a centerline of the jaw section than the third ramp portion.

20. The powered cross-linked polyethylene PEX expansion tool of claim 13, wherein each of the plurality of jaws includes an expansion tool facing slot configured to interface with a portion of the expansion tool to at least partially rotate the jaw section relative to the expansion tool during operation.

* * * * *

UNITED STATES PATENT AND TRADEMARK OFFICE
CERTIFICATE OF CORRECTION

PATENT NO. : 11,110,646 B2  
APPLICATION NO. : 16/519684  
DATED : September 7, 2021  
INVENTOR(S) : Brochman Page 1 of 1

It is certified that error appears in the above-identified patent and that said Letters Patent is hereby corrected as shown below:

On the Title Page

Item (57) Abstract Line 17:
Delete "VEX" and insert -- PEX --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*